United States Patent [19]

Robillard

[11] Patent Number: 4,905,202
[45] Date of Patent: Feb. 27, 1990

[54] DETECTION PANEL AND METHOD FOR ACOUSTIC HOLOGRAPHY

[75] Inventor: Jean J. A. Robillard, Las Cruces, N. Mex.

[73] Assignee: Richard L. Scully, Charlottesville, Va.

[21] Appl. No.: 138,438

[22] Filed: Dec. 28, 1987

[51] Int. Cl.$^4$ ............................................. G03H 3/00
[52] U.S. Cl. ........................................ 367/8; 367/10; 73/605
[58] Field of Search ....................................... 367/7–11, 367/135, 136, 140, 141, 178, 191; 252/299.7; 350/330; 356/345, 347; 73/605

[56] References Cited

U.S. PATENT DOCUMENTS 4,005,032  1/1977  Haas et al. .......................... 252/299.7
4,651,567  3/1987  Sandhu .................................. 367/7

OTHER PUBLICATIONS

Chapter 12 of "Acoustical Holography", vol. 1, Published by Plenum Press, New York, 1969, Farrah et al.

Primary Examiner—Thomas H. Tarcza
Assistant Examiner—Daniel T. Pihulic
Attorney, Agent, or Firm—Birch, Stewart, Kolasch & Birch

[57] ABSTRACT

A detection panel for acoustic holography with real time image reconstruction includes, a flat cell containing a mixture of nematic and cholesteric liquid crystals whose composition provides a refractive index which varies as a function of acoustic pressure. The cell has at least one acoustic window and at least one optical window.

10 Claims, 3 Drawing Sheets

DETECTION PANEL AND METHOD FOR ACOUSTIC HOLOGRAPHY

BACKGROUND OF THE INVENTION

1. Field of the Invention

This invention relates to a detection panel and method for acoustic holography.

2. Description of Related Art

The Application of holographic concepts to acoustic waves has led to a new and powerful method for ultrasonic detection and imaging. Acoustic holography is now currently used for a variety of applications from anti-submarine warfare to medical diagnosis.

The principle is quite similar to optical holography in that a reflected acoustic signal from an object is caused to interfere with a local source to form an acoustic hologram. Real time holographic viewing can be achieved by causing the acoustic image of the reflected beam to fall on an array of transducers providing signals which modulate the index of refraction of an electro-optic crystal allowing image reconstruction with a coherent beam of light (see Chapter 12 of the book "Acoustical Holography", Vol 1, published by the Plenum Press, New York, 1969).

The known system is represented in FIG. 1 and consists of a sound source 1 comprising a piezoelectric or magnetostrictive crystal oscillating at the frequency of a signal generator 2, a detector array 3 of piezoelectric or magnetostrictive elements, electronic signal processing circuits 4 and 5, a cathode ray tube 6 with an electro-optic crystal target, a coherent light source 7, optical data processing means 8, a TV camera 9, a TV monitor 10 and a recorder 11, the whole operating under the control of timing signals 12. The efficiency of signal detection as well as image resolution is very much dependent upon the characteristics of the receiving array of detectors. Various detection principles can be used including vibrating membranes in an electromagnetic field, variable capacitance, magnetorestriction and piezoelectricity. Piezoelectric ceramics are by far the most sensitive detectors and are widely used for ultrasonic detection. A representative value of the sensitivity is 1 V/$\mu$bar. The resolution of the image is limited by the size of the elements of the array which are generally equal to the wavelength $\lambda$ of the acoustic signal.

OBJECTS AND BRIEF SUMMARY OF THE INVENTION

It is an object of the present invention to provide a new pressure sensitive structure for the detection and viewing of acoustic images, in particular for real time image reconstruction in acoustical holography.

It is known that an extremely small amount of energy can change drastically the optical properties of liquid crystals. This is illustrated by various applications of liquid crystals in electronic displays or temperature sensors. In the former case a change of index of refraction is involved and in the latter a change in color is involved. In both cases a change is observed with energy input to the order of $10^{-14}$ Watts sec/cm$^2$.

Two types of liquid crystal structures related to optical properties are the nematic and the cholesteric phases. The nematic type has a rod-like structure with the rods oriented in a parallel direction. This particular structure provides optical anisotropy in the crystal and any slight departure from the alignment of the rods will result in a variation of the index of refraction of the material. In the cholesteric phase the rods are twisted with an increasing angle providing an helicoidal pattern. The periodicity, associated with the period of the helix, is responsible for the color generation in the cholesteric crystal.

Because of their extreme sensitivity to any cause that will alter the orientation pattern of the molecules, liquid crystals appear to be ideal for the detection of acoustic signals. Unfortunately, compressional waves do not affect the orientation of nematic crystals and they behave in that respect as a true liquid. Surprisingly, however, it has been found that a mixture of nematic and cholesteric liquid crystals does not react to a pressure wave in terms of a variation of index of refraction. Whereas the effect is small or non-existent for each separate phase, it increases to a maximum for a specific composition of a mixture of the two phases, the percentage of each phase corresponding to the maximum effect varying with the molecular structure of the two phases. It is therefore possible to choose an optimum composition of nematic and cholesteric crystals for maximum variation of the index of refraction as a function of the pressure. Also, the dynamic response of this variation to an acoustic wave will also depend on the composition of the two phases.

Accordingly, the present invention provides a detection panel for acoustic holography with real time image reconstruction, the panel comprising a flat cell containing a mixture of nematic and cholesteric liquid crystals whose composition provides a refractive index which varies as a function of acoustic pressure, the cell having at least one acoustic window and at least one optical window.

The use of a liquid crystal detection panel in acoustic holography introduces major advantages over present systems. It allows a direct conversion of the acoustic pattern into an optical pattern and eliminates the conversion of the acoustic signal into electrical and from electrical to optical form as is conventionally done for real time image reconstruction as represented in FIG. 1. With liquid crystal detection the reconstruction is performed on the panel itself with direct illumination from a coherent source. There is a gain in resolution, sensitivity and cost. The gain in resolution is because the conventional array of detectors is now replaced by a continuous layer of liquid crystal, the gain in sensitivity is due to the direct conversion of the acoustic signal into optical modulation thereby eliminating two operations each one of them introducing their own noise, and the gain in cost as well as size and weight is related to the elimination of the optical modulator and associated circuitry for the scanning and amplification of the signal.

The acoustic and optical windows may be one and the same, or they may be separately provided on opposite sides of the cell. In general, the acoustic window should comprise a material having a sound velocity much higher than that of water, preferably berylium where separate windows are used, in which case the optical window is preferably quartz. However, where a single window serves both purposes, the preferred material is fused silica. The window thickness is preferably 10 to 25 mm, and the layer of liquid crystal mixture is preferably 2 to 50 microns thick depending on the required resolution.

The invention also provides a method of acoustic holography using a detection panel according to the invention.

BRIEF DESCRIPTION OF THE DRAWINGS

Embodiments of the invention will now be described, by way of example, with reference to the accompanying drawings, wherein.

DETAILED DESCRIPTION OF PREFERRED EMBODIMENTS

Figure 1:
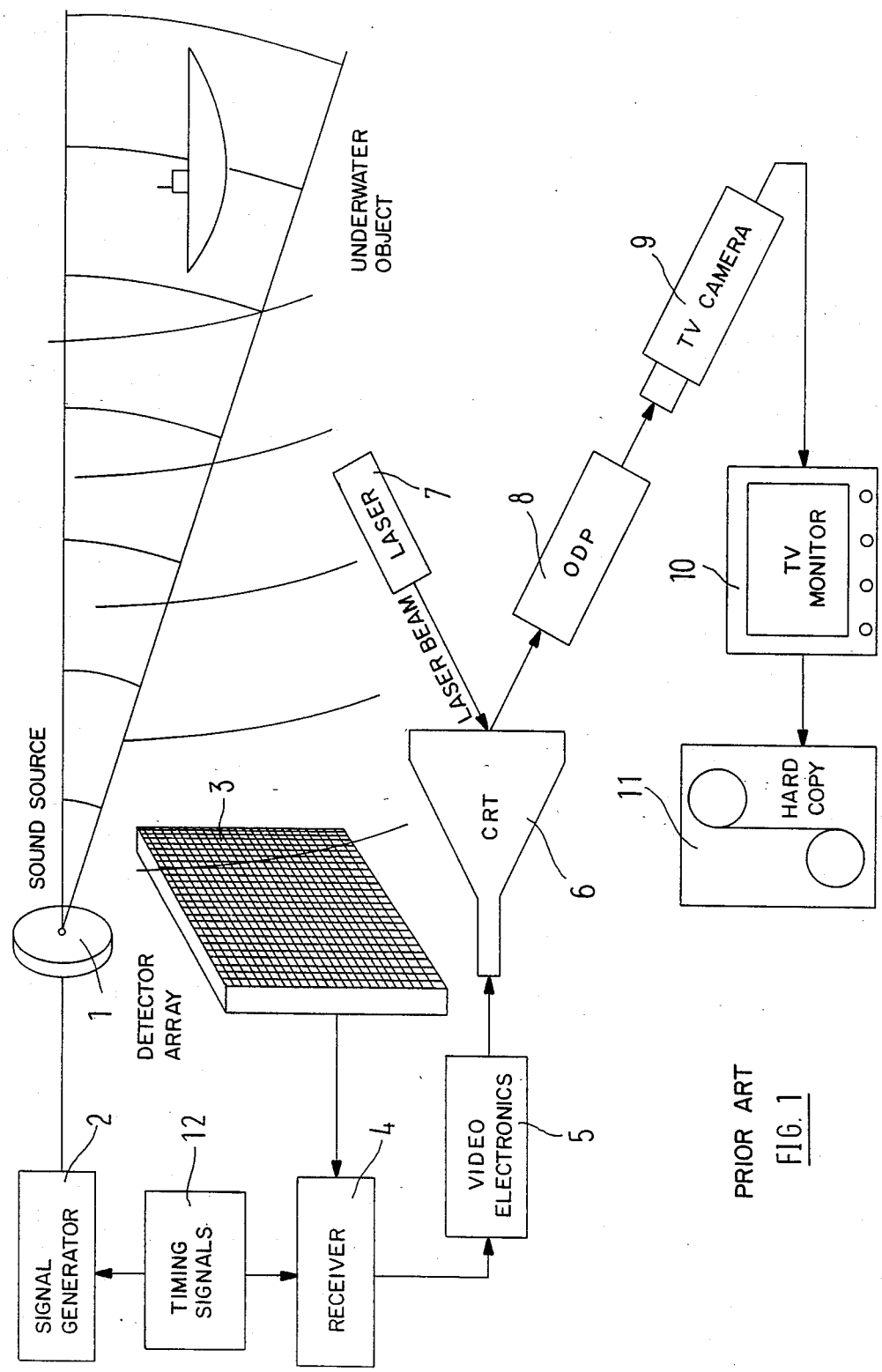
FIG. 1, previously described, is a schematic block diagram of a prior art system for acoustic holography.
Figure 2:
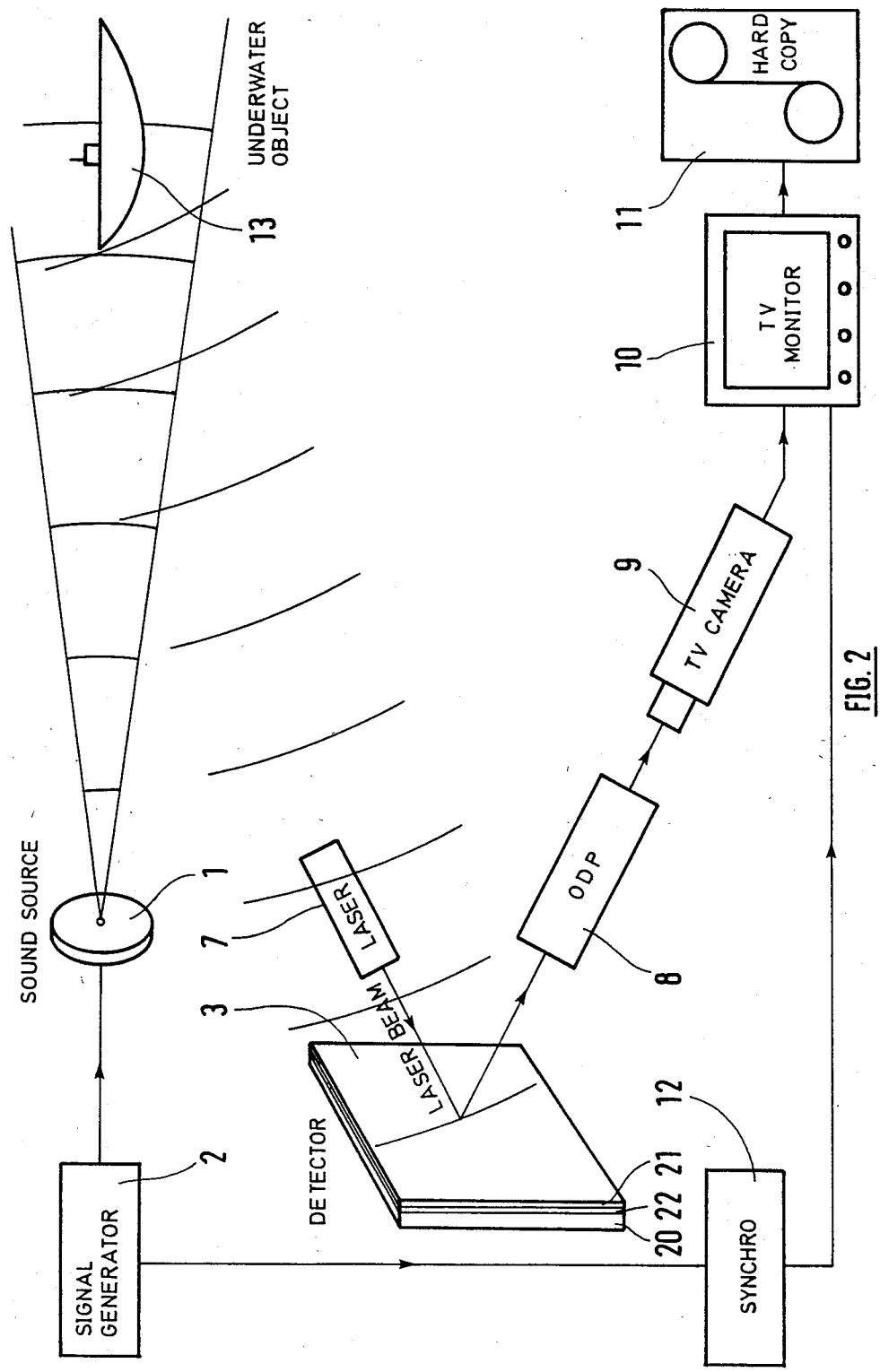
FIG. 2 is a schematic block diagram of an underwater acoustic holography system incorporating a detection panel according to a first embodiment of the invention.

Referring now to FIG. 2 in which the same reference numerals have been used as in FIG. 1 for the same or similar components, the system comprises a sound source 1 which is driven by an RF signal generator 2 to provide an acoustic wave which is reflected from an object 13 for detection, a liquid crystal detection panel 3, a coherent light source (laser) 7, optical data processing means 8, a TV camera 9, a TV monitor 10, a hard copy image recorder 11, and a generator of synchro signals 12 which maintain a constant phase relationship between the acoustic and optical signals, i.e. they are equivalent to the timing signals of FIG. 1. In the system an acoustic wave generated by the source 1 and reflected by the object 13 falls upon the detection panel 3 where it modulates the index of refraction over the liquid crystal layer in response to the phase and amplitude of the acoustic wave. The coherent light from the laser 7 is reflected by the detection panel 3 and modulated in phase and amplitude by the pattern of refractive indices in the liquid crystal layer. This provides a real time reconstruction of the acoustic holographic image of the object 13, which is viewed by the TV camera 9, displayed on the monitor 10 and recorded on the recorder 11.

The optical data processing means (ODP) 8 are conventional and include a polarizer to analyze the reflected laser beam and to provide a light signal which varies in intensity depending on the phase and amplitude of the reflected laser beam. For example, a large change in refractive index at one point in the layer of liquid crystal will produce a "dark" spot at the output of the ODP 8. Another type of ODP uses a dual polarizer and quarter wave plate.

It will be appreciated that, apart from the detection panel 3, the components of the system shown in FIG. 2 are fairly conventional in the acoustic holography art and a detailed description thereof is not thought to be necessary herein. If further details are required the reader is referred to the aforementioned book and to the articles mentioned in the list of references at the end of Chapter 12 thereof. The system is preferably operated at approximately 250 kHz to achieve a minimum noise level in the detection system—see the aforementioned article.

Turning now to the detection panel 3 itself, it is a flat liquid crystal cell and is preferably square with a side length of 10 cm to 1 meter, i.e. it has an area of 100 $cm^2$ to 1 $m^2$. The cell comprises a rear support base 20, a front window 21 parallel to the rear base 20, and a layer 22 of the liquid crystal mixture sandwiched between the two. Note that the necessary peripheral edge seal for the cell is not shown but such a seal is known in the art of large area liquid crystal display panels. The window 21 serves both as an acoustic window and as an optical window, and is preferably made of fused silica 10 to 25 mm thick. The liquid crystal layer 22, of which examples will be given later, is 2 to 50 microns thick.

Figure 3:
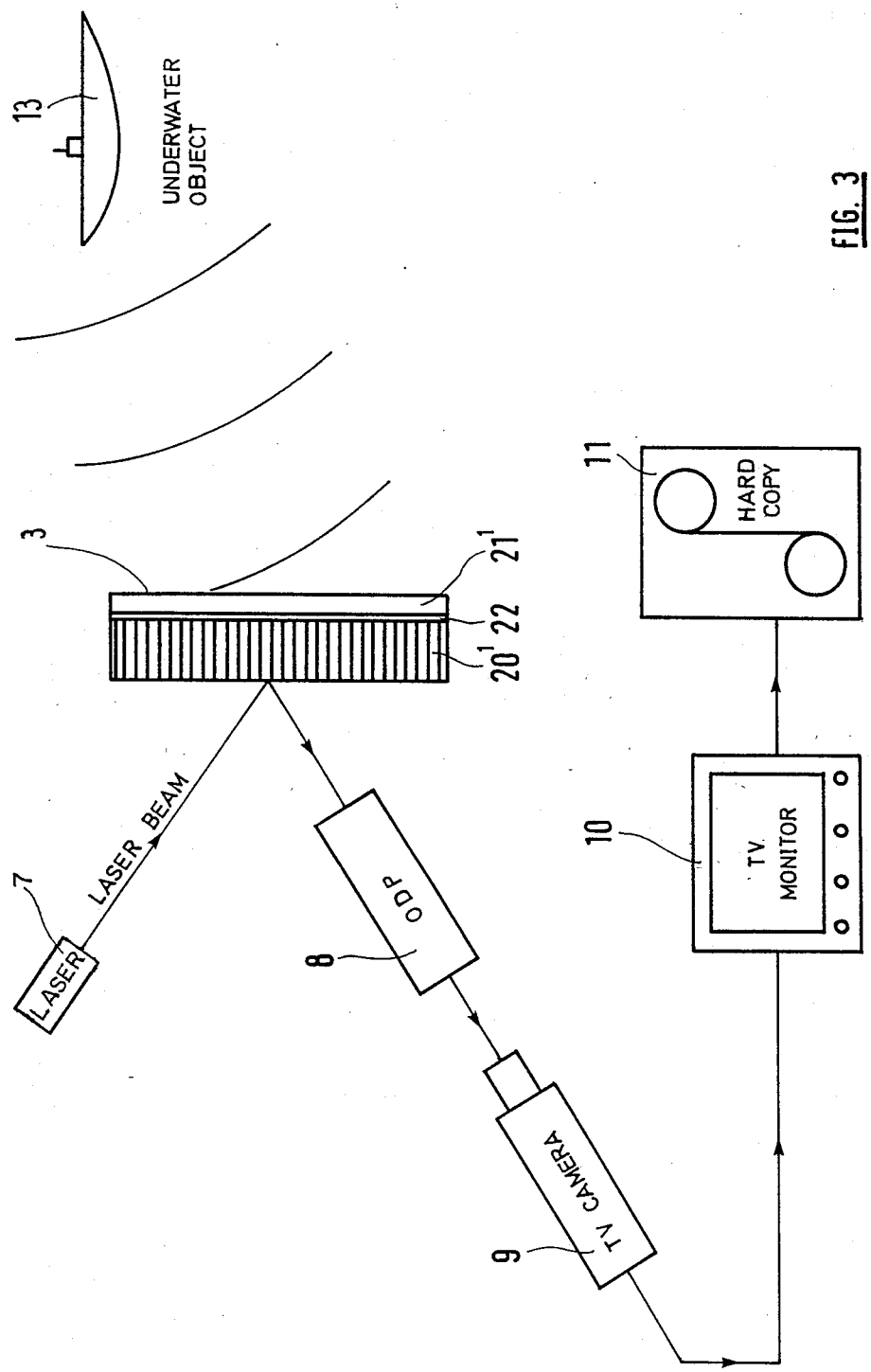
FIG. 3 is a schematic block diagram of a system incorporating a detection panel according to a second embodiment of the invention.

As is evident from FIG. 2, the coherent light from the laser 7 is reflected from the liquid crystal layer 22 through the dual purpose acoustic/optical window 21 at the front of the panel 3. Alternately, however, the coherent light from the laser 7 can be reflected by the liquid crystal layer from the back of the panel 3 through an optical window as shown in FIG. 3. This alternative is advantageous for under water operation where the complete detection system can be inside a ship or an immersed tank.

In this particular case the detection panel 3 will be a flat cell containing the liquid crystal 22 with a front acoustic window 21' and a back optical window 20'. The front acoustic window 21' is preferably made of berylium in this case, and the back optical window 20' may be made of quartz or, as shown, a fiber optic plate. The fiber optic plate consists of a large number of optical fibers arranged parallel to one another across the width of the plate and bonded together in conventional manner. For panels of a large cross-sectional area, to provide additional strength (although at the cost of reduced resolution) it is possible to form the layer 22 as an array of sub-cells by providing internal sidewalls extending front-to-rear across the gap containing the liquid crystal material.

It will be recognized that for simplicity FIG. 3 does not show the complete system.

The following non-limiting examples of the liquid crystal mixture 22 represent optimum compositions for maximum pressure sensitivity:

EXAMPLE 1

Cholesteryl Oleate: 32.8%,
Butoxybenzoic acid: 67.2%.

EXAMPLE 2

Cholesteryl Oleyl Carbonate: 30.0%,
4,4 dimethoxy azoxybenzene: 70.0%.

EXAMPLE 3

Cholesteryl benzoate: 5.0%,
4 methoxy-4'-butylamide: 95.0%.

EXAMPLE 4

Cholesteryl nonanoate: 42.0%
Butoxybenzilidene cyanoaniline: 58.0%.

EXAMPLE 5

Cholesteryl butyrate: 25.0%,
4-4' dimethoxyazoxybenzene: 75.0%.

EXAMPLE 6

Cholesteryl-p-cyano benzoate: 16.0%,
MBBA *: 23.0%,
Butoxybenzydenecyanoaniline: 61.0%.

I claim:

1. A system for acoustic holography comprising:
    means for projecting an acoustic wave onto an object;

a detection panel for receiving the acoustic wave after reflection from the object, said detection panel being in the form of a flat cell containing a liquid crystal layer including a mixture of nematic and cholesteric liquid crystals whose composition provides a refractive index which varies as a function of acoustic pressure;

at least one optical window and at least one acoustical window provided in connection with the flat cell of said detection panel, the flat cell being oriented to receive the reflected acoustic wave through the acoustic window so that the refractive index is varied over the liquid crystal layer in response to the phase and amplitude of the reflected acoustic wave;

means for directing coherent light at the optical window of said detection panel, the light reflected from the liquid crystal layer being modulated in phase and amplitude by the refractive index variations of the liquid crystal layer; and means for producing a visible image from the modulated light reflected from the liquid crystal layer.

2. A system according to claim 1, wherein the acoustic and optical windows comprise a single window.

3. A system according to claim 1, wherein the acoustic and optical windows are separately provided on opposite sides of the cell.

4. A system according to claim 1, wherein the mixture of liquid crystals comprises 32.8% cholesteryl oleate and 67.2% butoxybenzoic acid.

5. A system according to claim 1, wherein the mixture of liquid crystals comprises 30% Cholesteryl Oleyl Carbonate and 70% 4,4' dimethoxyazoxybenzene.

6. A system according to claim 1, wherein the mixture of liquid crystals comprises 5% cholesteryl benzoate and 95% methoxy 4'-butylaniline.

7. A system according to claim 1, wherein the mixture of liquid crystals comprises 42% cholesteryl nonanoate and 58% butoxybenzilidenecyanoaniline.

8. A system according to claim 1, wherein the mixture of liquid crystals comprises 25% cholesteryl butyrate and 75% 4-4' dimethoxyazoxybenzene.

9. A system according to claim 1, wherein the mixture of liquid crystals comprises 16% cholesteryl-p-cyanobenzoate, 23% MBBA * and 61% butoxybenzylidenecyanoaniline.

10. A method for acoustic holography, comprising the steps of:
   (a) projecting an acoustic wave onto an object;
   (b) receiving the acoustic wave onto a detection panel after reflection from the object, the detection panel being in the form of a flat cell containing a liquid crystal layer comprising a mixture of nematic and cholesteric liquid crystals whose composition provides a refractive index which varies as a function of acoustic pressure, the cell having at least one optical window and at least one acoustic window and the reflected acoustic wave being received through the window so that a refractive index is varied over the liquid crystal layer in response to the phase and amplitude of the reflected acoustic wave;
   (c) directing coherent light at the optical window of the detection panel;
   (d) modulating the light being reflected from the liquid crystal layer in phase and amplitude according to the refractive index variations of the liquid crystal layer; and
   (e) producing a visible image from the modulated light reflected from the liquid crystal layer.

* * * * *